US007933453B2

(12) United States Patent
Molnar et al.

(10) Patent No.: US 7,933,453 B2
(45) Date of Patent: Apr. 26, 2011

(54) SYSTEM AND METHOD FOR CAPTURING AND PROCESSING BUSINESS DATA

(75) Inventors: Joseph Molnar, Palo Alto, CA (US); Paulo Ferreira, Mississauga, CA (US); Dan Nieuwland, Toronto (CA); Andrew H. Mutz, Palo Alto, CA (US)

(73) Assignee: scanR, Inc., Palo Alto, CA (US)

( * ) Notice: Subject to any disclaimer, the term of this patent is extended or adjusted under 35 U.S.C. 154(b) by 0 days.

(21) Appl. No.: 12/616,618

(22) Filed: Nov. 11, 2009

(65) Prior Publication Data

US 2010/0054605 A1  Mar. 4, 2010

Related U.S. Application Data

(63) Continuation of application No. 12/245,447, filed on Oct. 3, 2008, now Pat. No. 7,639,875, which is a continuation of application No. 11/176,592, filed on Jul. 6, 2005, now Pat. No. 7,450,760, which is a continuation-in-part of application No. 11/133,049, filed on May 18, 2005, now Pat. No. 7,640,037.

(51) Int. Cl.
 *G06K 9/46* (2006.01)
 *G06K 9/62* (2006.01)
 *G06K 9/22* (2006.01)
 *H04M 1/00* (2006.01)

(52) U.S. Cl. ...... 382/190; 382/224; 382/313; 455/556.2

(58) Field of Classification Search ................. 382/157, 382/190, 224, 254, 263, 266, 313; 455/556.2, 455/557

See application file for complete search history.

(56) References Cited

U.S. PATENT DOCUMENTS

| 6,243,713 | B1 | 6/2001 | Nelson et al. |
|---|---|---|---|
| 6,687,697 | B2 | 2/2004 | Collins-Thompson et al. |
| 6,920,609 | B1 | 7/2005 | Manber et al. |
| 6,970,601 | B1 | 11/2005 | Kaneda et al. |
| 7,007,105 | B1 | 2/2006 | Sullivan et al. |
| 7,139,014 | B1 | 11/2006 | Kim et al. |
| 7,197,746 | B1 | 3/2007 | Goldberg |
| 2002/0083079 | A1 | 6/2002 | Meier et al. |
| 2002/0103908 | A1 | 8/2002 | Rouse et al. |
| 2003/0036365 | A1 | 2/2003 | Kuroda |

OTHER PUBLICATIONS

Pratt, William K., "Chapter 10: Image Enhancement", from Digital Image Processing, John Wiley & Sons, New York, 1991.
Tompkins, et al., "Lossless JBIG2 Coding Performance," Proc. Data Compression Conference, IEEE Computer Society Press, 553, 1999.
International Search Report and Written Opinion mailed Sep. 14, 2007 for International Application No. PCT/US06/18134, 8 pgs.
Allen, James "Natural Language Understanding," 1995, Benjamin-Cummings Publishing Companys, Inc., 36 pgs.
Aho, Alfred V., "Compilers: Principles, Techniques, and Tools," Dec. 1985, Addison-Wesley Publishing Company, pp. 15 pgs.

(Continued)

*Primary Examiner* — Daniel G Mariam
(74) *Attorney, Agent, or Firm* — Frommer Lawrence & Haug LLP; John W. Branch

(57) ABSTRACT

A method and a system for interpreting information in a document are provided, with the system receiving an image of a document from a remote source and converting it into multiple sets of blocks of characters. Tags indicating likely meaning of blocks are assigned to them. At least some of the blocks have an associated score representing the probability that the characters in the block correctly represent the characters in the original image. The system selects one set from multiple sets based on the scores associated to certain blocks determined by accessing remote information over the Internet.

20 Claims, 13 Drawing Sheets

OTHER PUBLICATIONS

Umar, Amjad "Object-Oriented Client/Server Internet Environments: The Modern IT Infrastructure," 1997, Prentice Hall PTR, New Jersey, 5 pgs.

Office Communication for U.S. Appl. No. 12/245,447, mailed Mar. 17, 2009. (6 pgs).

Office Communication for U.S. Appl. No. 12/245,447, mailed Aug. 12, 2009. (7 pgs).

SYSTEM AND METHOD FOR CAPTURING AND PROCESSING BUSINESS DATA

CROSS REFERENCE TO RELATED APPLICATION

This application is a Continuation of allowed U.S. patent application Ser. No. 12/245,447, filed Oct. 3, 2008 now U.S. Pat. No. 7,639,875 which is a Continuation of allowed U.S. patent application Ser. No. 11/176,592, filed Jul. 6, 2005, now U.S. Pat. No. 7,450,760, issued Nov. 11, 2008 which is a Continuation-In-Part of U.S. patent application Ser. No. 11/133,049, filed May 18, 2005, now U.S. Pat. No. 7,640,037 the benefits of which are claimed under 35 U.S.C. §120 and wherein further each are incorporated herein in their entirety by reference.

BACKGROUND

Cellular (cell) telephones with built-in cameras are well known and widely used. Such phones permit taking a photograph and storing it within the phone. Then, the photograph can be transmitted to a user's e-mail mail box as an attachment using well-known technology of transmitting image data via cellular telephony. Further, it is known to include in a cell phone a relatively powerful processor and related electronics which are capable of supporting a variety of applications.

However, a cell phone-camera-email combination has not been effectively utilized for applications outside of capturing and transmitting photographs. For example, it would be desirable to capture business cards, text documents, forms, handwritten notes and other business, technical, or specialized documents and provide them to a user in a convenient format consistent with the nature of the document. For example, it would be desirable to use a cell phone to capture a business card and provide it to the user as interpreted data suitable for entry into user's computerized contact organizer. Similarly, it would be useful to capture a document and provide it to the user as recognized text, or to capture handwritten notes and provide them to the user as a text document.

Although technologies exist for storing business cards, performing optical character recognition (OCR) and handwriting recognition (ICR), such technologies have not been effectively combined with cellular imaging applications. Since professionals spend significant time away from their offices, their most readily accessible communications tool is a cellular telephone. Thus, it is valuable to adapt a cell phone with a camera to the needs of professionals and business people. For example, a professional may find it highly useful to capture a business card received at a convention using her cell phone and transfer it in an interpreted form to her e-mail account. Likewise, it would be useful to transmit notes generated at an out-of-the-office meeting to user's e-mail mail box as text immediately after the meeting.

Thus, despite the availability of many technological components, technology is still lacking for many applications for business and professional users of cell phones. Such users may need specialized processing of various types of information which is generally referred to herein as documents or professional information.

BRIEF DESCRIPTION OF THE DRAWING FIGURES

DETAILED DESCRIPTION

Figure 1:
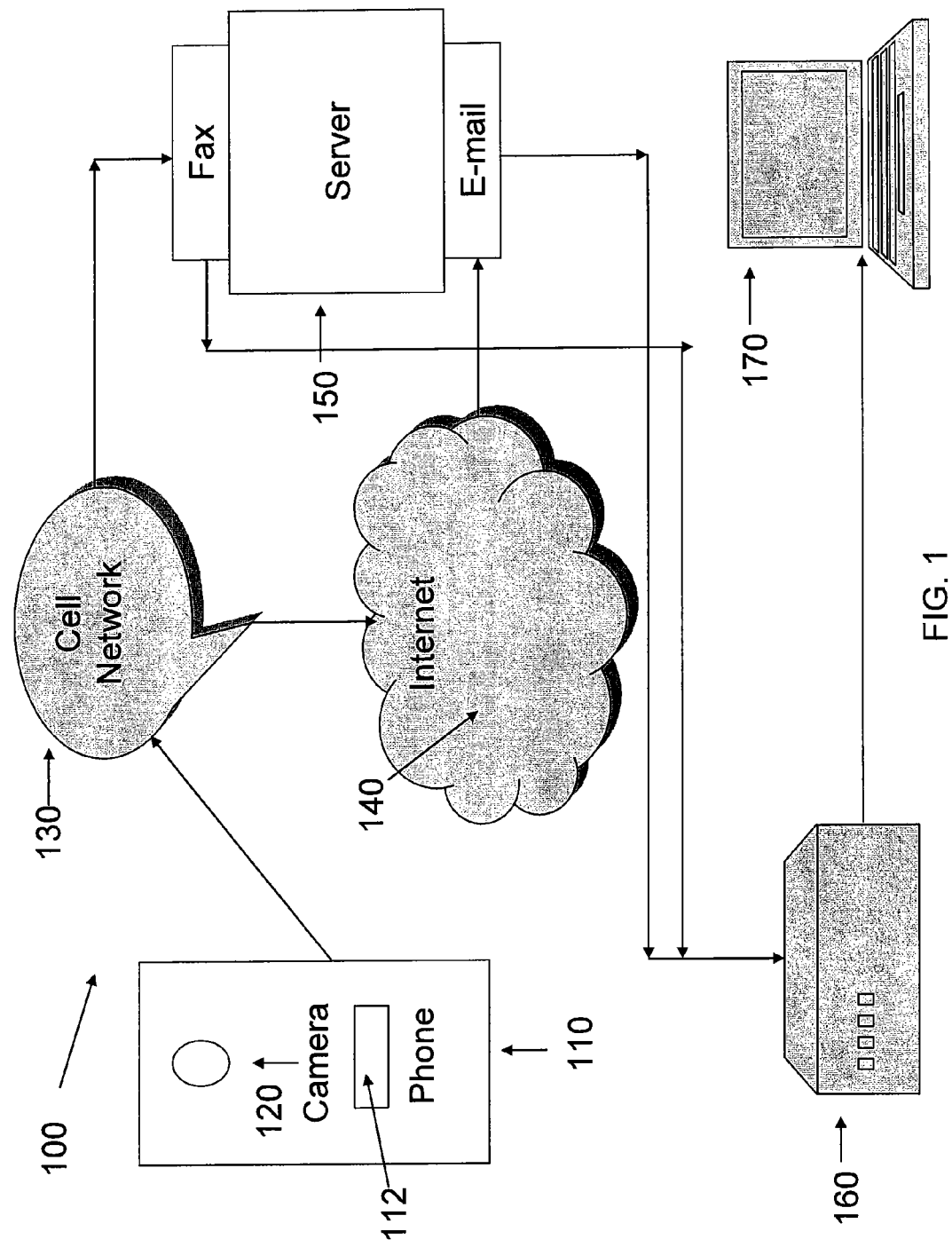
FIG. 1 is a schematic diagram illustrating a computer architecture associated with a system for capturing and processing data according to one exemplary embodiment of the present invention.

Referring first to FIG. 1 which is a schematic diagram illustrating a computer architecture associated with a system 100 for capturing and processing data according to one exemplary embodiment of the present invention. The system 100 and its related processing methods, as well as other related methods, can also be thought of and is referred to herein as being a service. The illustrated system 100 includes a handheld communication device 110 which according to one exemplary embodiment is a cellular phone. The cellular phone 110 includes traditional components, such as a processor or the like, as well as standard communication software, etc. The cellular phone 110 is of the type that includes a camera 120 that permits a user to capture and store an image. The camera 120 can be of any number of different types of cameras so long as the camera 120 is of the type intended for use in a cellular phone and therefore is a micro-sized camera. As a result of having the camera 120 being a part thereof, the cellular phone 110 includes additional software for processing the images that are captured using the camera 120.

In addition and as described in greater detail hereinafter, the cellular phone 110 includes software for processing preselected information (e.g., professional information) but it otherwise constructed as a typical conventional camera cellular phone. The cellular phone 110 can optionally include various other known features customarily available in such phones, including a contacts organizer and personal computing capabilities.

The cellular phone 110 communicates with a cellular network 130, which in turn communicates with an Internet network 140 (Internet). The system 100 also includes a post-processing server 150 associated with the service provided by the system 100 and which is intended to receive over the Internet 140 the pre-selected information (e.g., professional information) that is transmitted by the cellular phone 110. The post-processing server 150 converts the received information into a more desirable format and then transmits the results over the Internet 140 to a user's mail server 160. Alternatively or in combination with transmitting the results to the mail server 160, the results can be sent via facsimile to the user or stored on a computer associated with the illustrated system 100. For example, a user's computer 170 (which may be the same as cellular phone 110) can access the pre-selected information (professional information) via Internet 140 as known in the art. Servers and others technologies known in the art are not limited to specific embodiments and may include various known and subsequently developed implementation. For example, a server may have distributed or other suitable architecture understood by a person skilled in the art.

Figure 2:
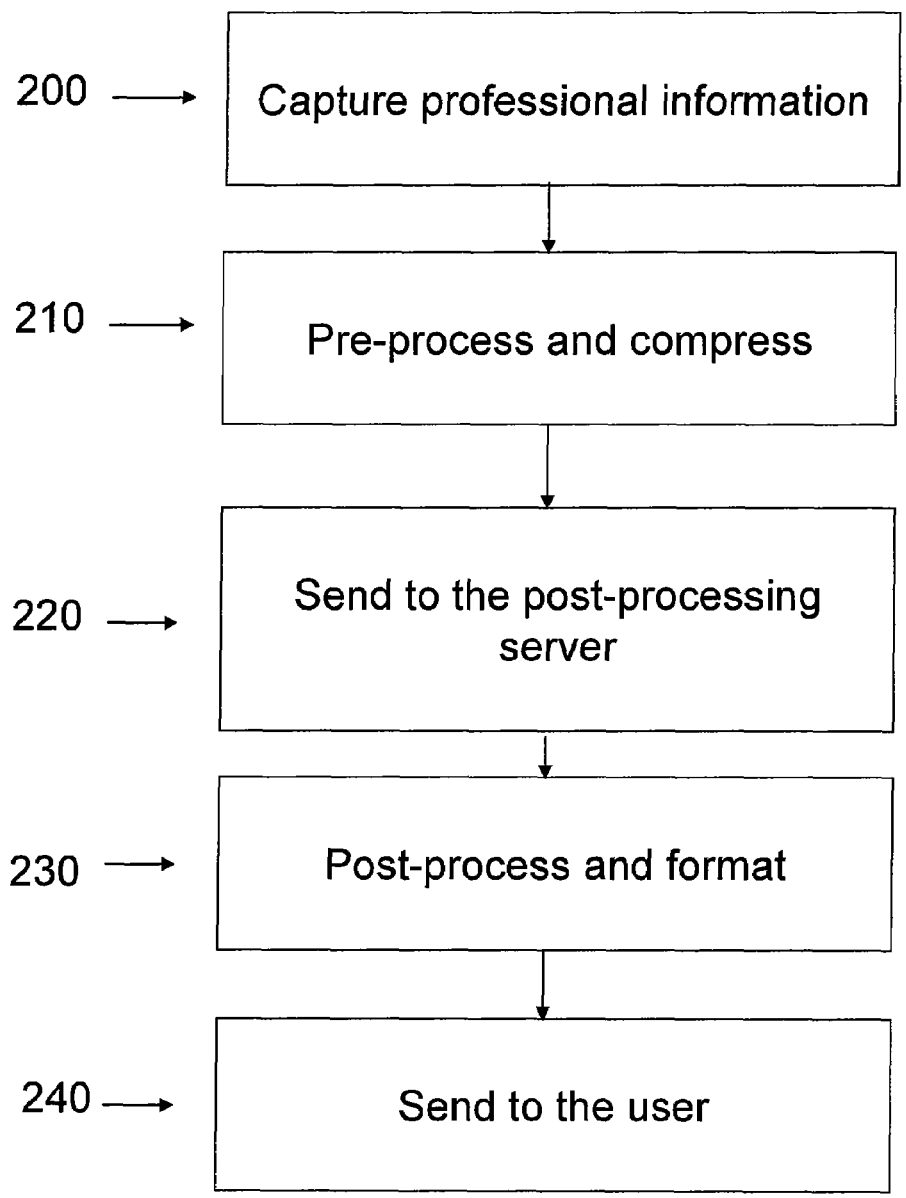
FIG. 2 is a flow chart illustrating steps of one exemplary operation of the system of FIG. 1.

FIG. 2 is a flow chart showing one aspect of how the system 100 operates according to one exemplary embodiment with respect to capturing and then processing the pre-selected information. For the purpose of illustration only, the pre-selected information will be discussed herein as being professional information, as described in greater detail below; however, it will be understood that the pre-selected information is not limited to being professional information as described below but instead can be any type of information that the user wishes to capture and process in the manner described herein.

At a step 200, the professional information is captured in the form of a digital image using the camera 120 of the cellular phone 110. For example, when the professional information is in the form of some type of text or an image or some other type of indicia, the information can be captured by focusing the camera 120 on the object and then initiating the capture of the information as by pressing a button or the like on the cellular phone 110. At step 210, the captured professional information is preferably and appropriately pre-processed and preferably compressed. At step 220, the captured professional information is sent to the post-processor server 150 (FIG. 1) using any number of different communication protocols. For example, the captured professional information can be transmitted to the post-processor server 150 as an attachment to an e-mail using communication protocol and conventional techniques. The post-processor server 150 converts the received professional information into a desired format consistent with such information as indicated at step 230. Then the processed information is transmitted at step 240 to the user via any number of different communication techniques, including transmitting the processed information via an e-mail or the processed information can be delivered to the user as a facsimile or the processed information can be stored internally. The properly formatted professional information is then available to the user in a personal email account or otherwise as mentioned above.

Figure 3A:
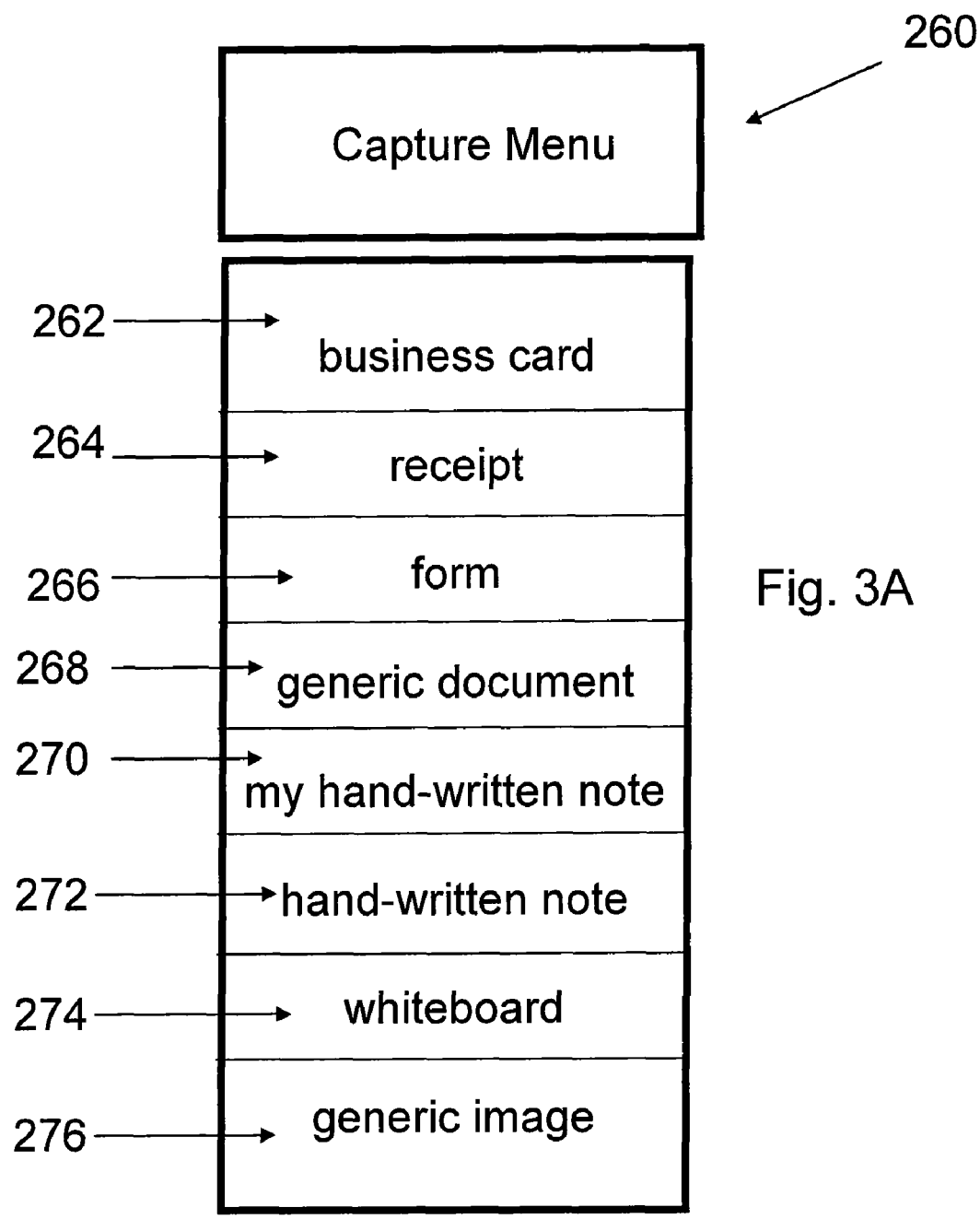
FIG. 3A is a schematic diagram of a user interface menu according to one exemplary embodiment that is accessed using a handheld device associated with the system of FIG. 1.

Preferably, the user interface (e.g., a key pad or the like 112 of FIG. 1) of the cellular phone 110 includes a selection or means for enabling capturing of professional information. This can be in the form of a button as part of the interface 112 or the like on the user interface of the phone 110. When this means 112 is selected, a user is provided with a menu 260 as depicted in FIG. 3A. As will be understood, the menu 260 is displayed on a display associated with the handheld device (cellular phone 110). The menu 260 is a scrollable menu that identifies different types of pre-selected information, in this case business information, that can be captured by the user. For the purpose of illustration, the menu 260 includes the following entries or categories, all of which are different types of business information that can be captured and processed by the user. The menu 260 includes entries for (a) a business card 262; (b) a receipt 264; (c) a text document 266; (d) notes 268, e.g. handwritten text and pictures; (e) notes in user's handwriting 270; (f) whiteboards 272; (g) forms 274; and (h) any unspecified images 276. The menu 260 may contain a subset of the above information or it may identify other information and therefore, the above entries are merely exemplary in nature. Also a default setting may be pre-selected and incorporated into the operating software. Of course, the default setting can be changed by the user. Based on the type of the professional information selected by the user, the cellular phone 110 performs adjustments for more efficient capture and pre-processing of professional information. In other words, if the user selects business card 262 on the menu 260, the processor of the cellular phone 110 can provide the camera 120 with specific imaging commands or the like in order to make any adjustments that may result in a better quality image being captured. Accordingly, the optimal conditions for the camera 120 when capturing the image of a business card 262 may be different than the optimal conditions for capturing an image of the user's handwritten notes 270 (which might require a finer resolution to pick up fine details) in order for all the handwriting to be legible and permit it to be more accurately processed.

Figure 3B:
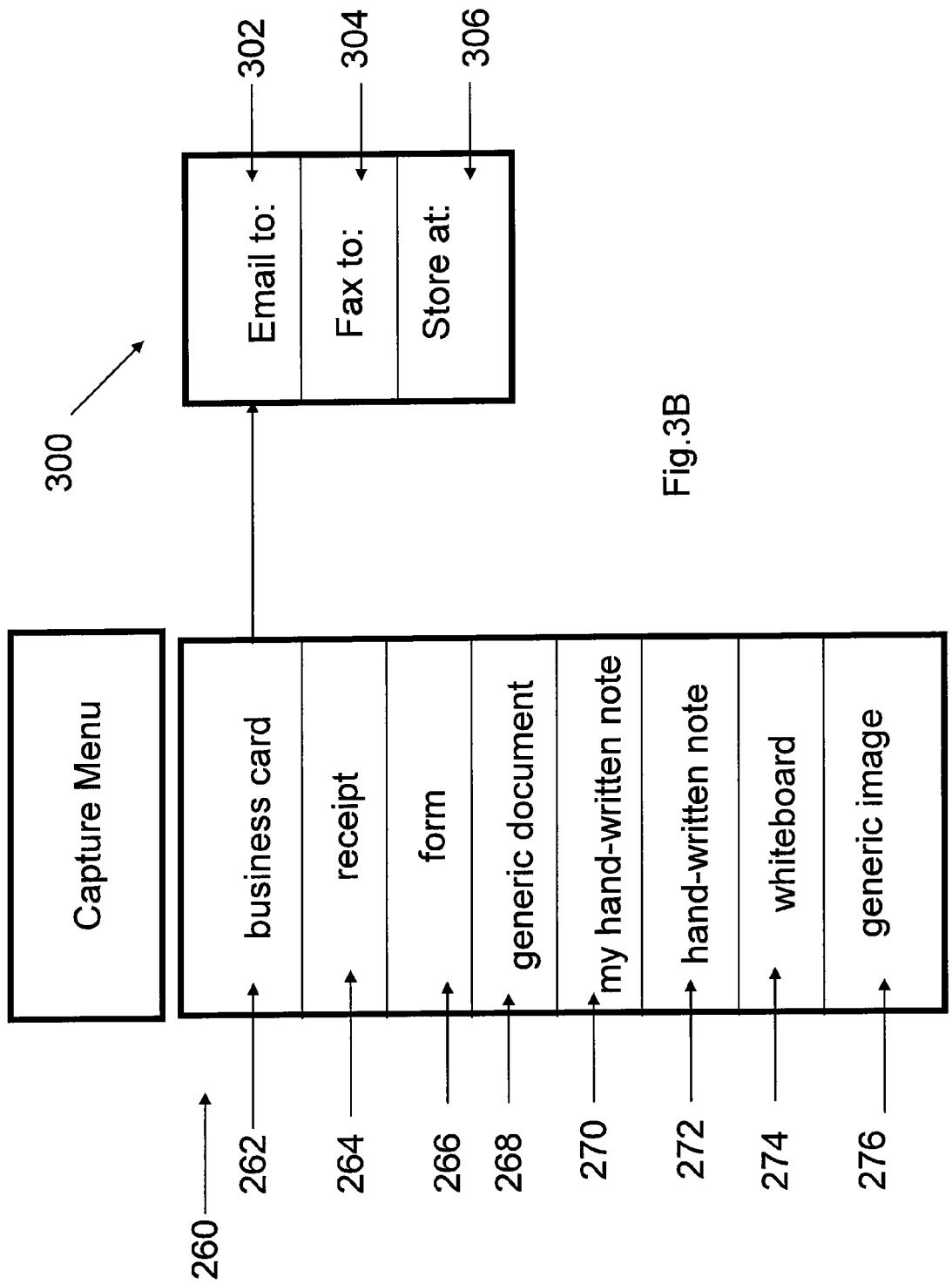
FIG. 3B is a schematic diagram of a submenu of the user interface menu of FIG. 1.

Preferably, the user is provided with an additional submenu 300 as depicted in FIG. 3B, so that the user has an option to specify where to send or how to store the above-mentioned professional information that has been selected and captured by the user. For example, each of the menu entries 262-276 can include a submenu 300, with the submenu 300 being either the same for the menu entries 262-276 or different. The submenu 300 can be accessed using standard menu protocol, such as highlighting the selected information and then clicking a button or using a mouse type tool to navigate the submenu 300. In the example shown in FIG. 3B, submenu 300 includes an e-mail delivery option (icon or entry 302); a facsimile delivery option (icon or entry 304); and a stored at option (icon or entry 304). Once again, a default setting may be pre-selected as part of the submenu 300. For example, the default can be that the selected and captured professional information is to be delivered as an attachment file to an e-mail.

Figure 4:
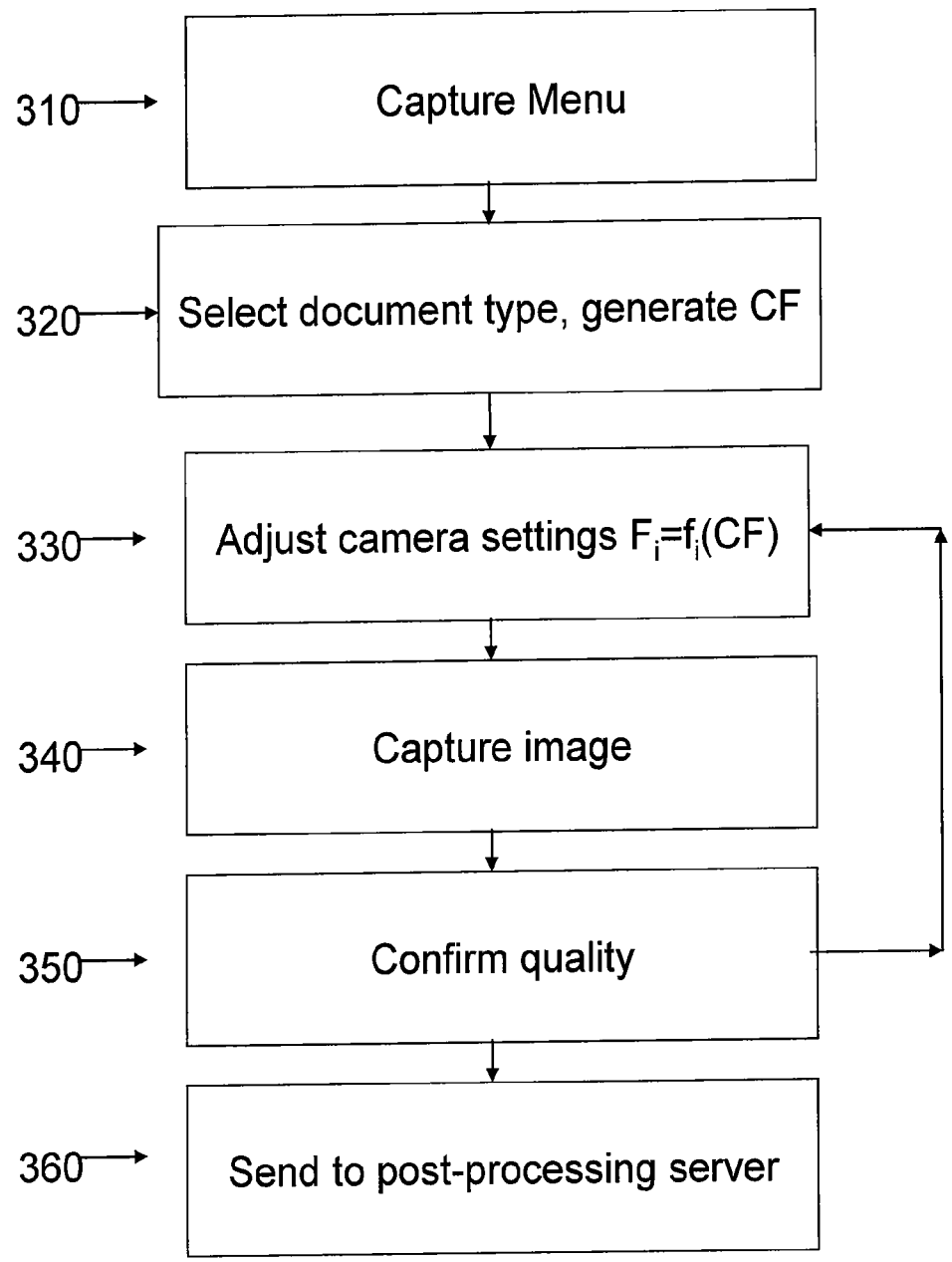
FIG. 4 is a flow chart illustrating a process flow of software components, according to one exemplary embodiment, that are associated with a handheld device that is itself associated with the system of FIG. 1 and supports a service provided thereby.

In one embodiment, the professional information can be completely processed at the post-processing server 150 (FIG. 1) as shown in the process flow chart of FIG. 4. At step 310, the user selects the option of capturing professional information (pre-selected information) and at step 320, the user selects the type of professional information that is to be captured and processed, using a menu, e.g., menu 260 of FIG. 3a. Based on the selected document type (e.g., business card 262) and its destination, as selected in the submenu 300, the system 100 generates and stores the corresponding capture flag (CF). Subsequently the camera 120 settings are adjusted based on the CF value for more optimal capturing conditions as set forth in step 330.

Specifically for business cards, receipts, documents, forms and notes, the capture operation proceeds as follows. The camera 120 exposure time is set to a shorter duration than for ordinary pictures and the flash is turned off. Preferably, the exposure time is roughly one half of the focal length. So for a 35 mm lens, the exposure time is preferably $\frac{1}{70}$th of a second or less. But the exposure time is also bounded by image noise. For example, it is preferred to set the camera ISO to 400 with acceptable noise level and use a 1/100th of a second exposure time. Such a setting would produce more noise than with a usual camera setting, but post-processing can provide some noise cleanup and an OCR is not very sensitive to this noise, which is primarily CCD noise.

For white boards, the exposure settings are left unchanged and the flash is on. Also it should be noted that a white board is optionally captured with a series of photographs or digital images. Accordingly, if the capture flag (CF) identifies a white board selection, the user continues taking/capturing images in the document capture mode until the user enters an 'escape' or a similar command that ends the document capture mode and the capturing of the images. The user interface of the cellular phone 110 can also include an option to specify the order in which the pictures of a whiteboard are to be taken (for example: left to right, top to bottom, etc.).

The image of the document is then captured (photographed) at step 340 and the user is provided with the visual image as presently done for captured cellular phone images/photographs as indicated at step 350. In other words, the captured image is displayed on the screen that forms a part of the cellular phone 110 and if the user is dissatisfied with the resultant image, the user can simply return to the capture image step 340 and the process is repeated until the user is satisfied with the quality of the captured image. This can be done by simply incorporating a series of pop-up windows or menus or the like as part of the software to ask the user if the user is satisfied with the quality of the captured image and wishes to continue the process. For example, a window with a "yes" box and a "no" box can be displayed and the user can toggle between or otherwise highlight one of these boxes to indicate whether to repeat the image capturing process or to continue to the next step.

If the user is satisfied with the quality of the captured image, then the next step, indicated at 350, is that the captured image is sent to the post-processing server 150 (FIG. 1) in an appropriate form, such as an e-mail message that can include an ordinary e-mail text generated on the cellular phone 110 as well. The capture flag (CF) identifying the type and disposition of the document is included in the e-mail message as well. The image can be sent from the post-processing server 150 to other interfaces (e.g., a facsimile machine, etc.) as well.

It should also be noted that one user who has a cellular phone 110 which has no access to the various components of the present system 100 can instead send the captured image over a wireless connection to a cellular phone 110 of a user who has access to the system 100 and the service provided thereby. Then, this image is processed as specified herein except the step 340 of capturing the image with the camera 120 is omitted. In essence in such a use, the image capturing has previously been done by a different use and the current user merely is provided with the captured image by receiving the captured image by means of the mobile handheld device (cellular phone 110) through a wireless interface.

Figure 5:
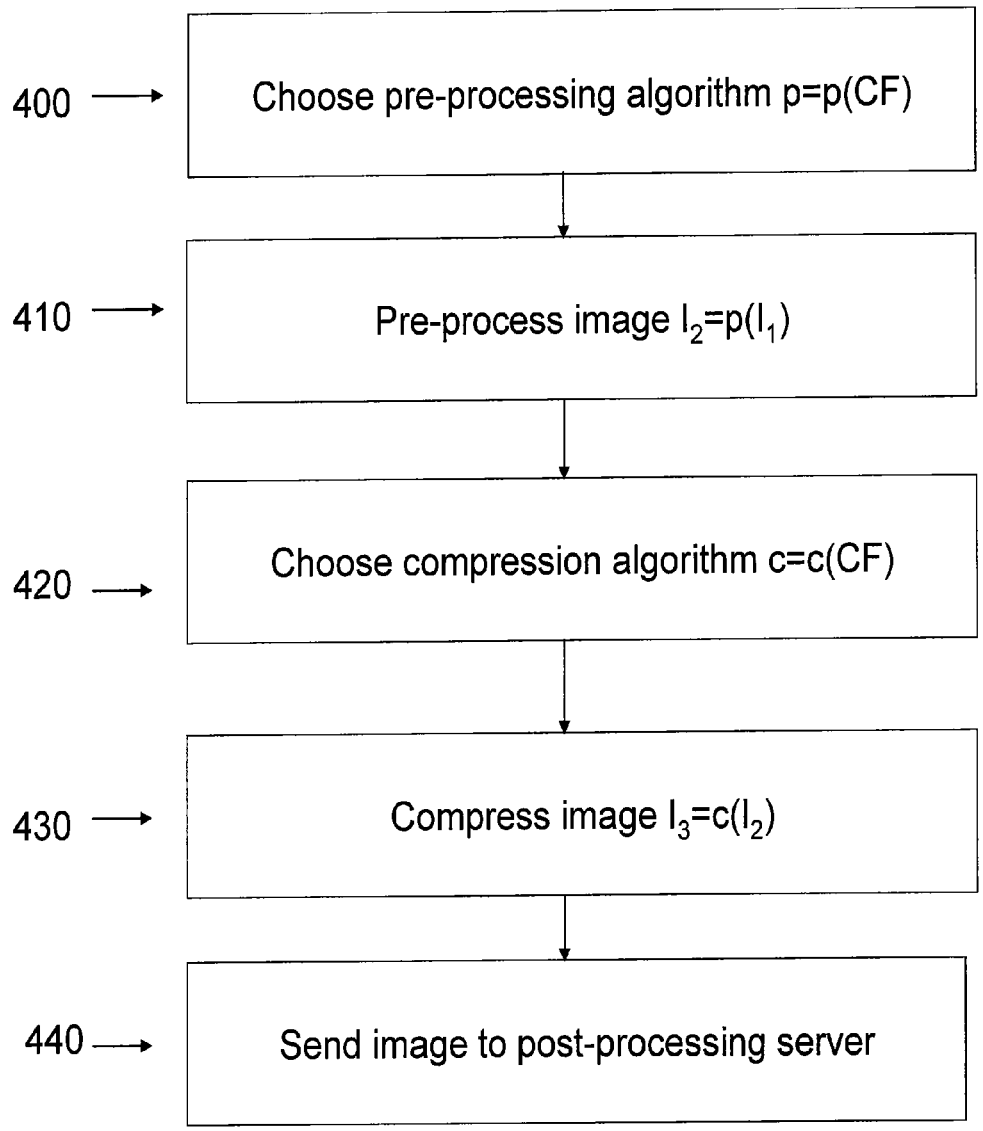
FIG. 5 is a flow chart illustrating a process flow of software components, according to a different exemplary embodiment, that are associated a handheld device that is itself associated with the system of FIG. 1 and supports a service provided thereby.

In another embodiment, illustrated in FIG. 5, cellular phone software provides camera settings adjustment, image pre-processing and image compression based on the document type. In this embodiment, the initial steps, namely steps 310, 320, and 330 of FIG. 4, are the same as in the previous embodiment described with reference to FIG. 4.

After the camera setting has been completed, several or more (e.g., three) images/pictures of the document or imaged object are taken. Then the resultant captured images are pre-processed in accordance with the CF flag as depicted in FIG. 5. Specifically at steps 400 and 410, images of business cards, business forms, notes, and/or receipts are pre-processed using the following steps. First in each of the three captured images the document is identified and tagged. The surrounding fields are removed and the segmentation step (background, foreground) is performed using known techniques. Subsequently the image with the least motion blur is selected using imaging techniques known in the art. In the selected image, a deskew operation is performed, as known in the art, so as to orient the image to be substantially parallel to the boundaries of the frame. Next, the image is corrected by removal of barrel distortion using known techniques. Notably, the deskew operation is performed for whiteboards but there is no need to remove barrel distortion. Finally, the noise is removed from the image of any available type. The level of noise is recorded so that if the user is dissatisfied with the quality of the image may adjust the capture settings accordingly. Image processing steps referred to in connection with image pre-processing are known in the art, see, e.g., "Digital Image Processing" $3^{rd}$ edition by William K Pratt, which is incorporated herein by reference in its entirety, and therefore these steps are not described in any great detail herein.

The selected captured image has now been pre-processed and control is transferred to compression software as generally indicated in steps 420 and 430. During compression, first, the captured image of a business card, receipt, generic text document, or business form is converted into only gray scale data. That is, all color information has been disregarded using known techniques. Then, the captured image is compressed using a compression algorithm suitable for printed text (see, for example, "Lossless JBIG2 Coding Performance", Proc. Data Compression Conference, IEEE Computer Society Press, 553.), which is incorporated herein by reference in its entirety.

The compression steps 420, 430 for an image of a note are similar to the steps described above except that the compression algorithm is optimized for handwritten text (for example, see commercially available software developed by Charactell Ltd). The compression algorithm for user hand written notes can be trained for a specific user as known in the art. The white boards and generic images can be compressed with generic JPEG algorithm. Finally, the compressed image with a capture flag value is sent to the post-processing server 150 via a variety of conventional interfaces.

In yet another embodiment, the system may include cellular phones 110 with different capabilities, so that some cellular phones 110 are not able to perform some or all steps necessary for proper pre-processing and/or compression of the captured image. In this case, the capture flag (CF) can have additional fields to identify hardware and/or software versions of the user's cellular phone 110. Consequently, the post-processing can be adjusted for a particular input cellular phone 110, since the server receives information about the pre-processing and compression (if any) performed at the phone 110.

Figure 6:
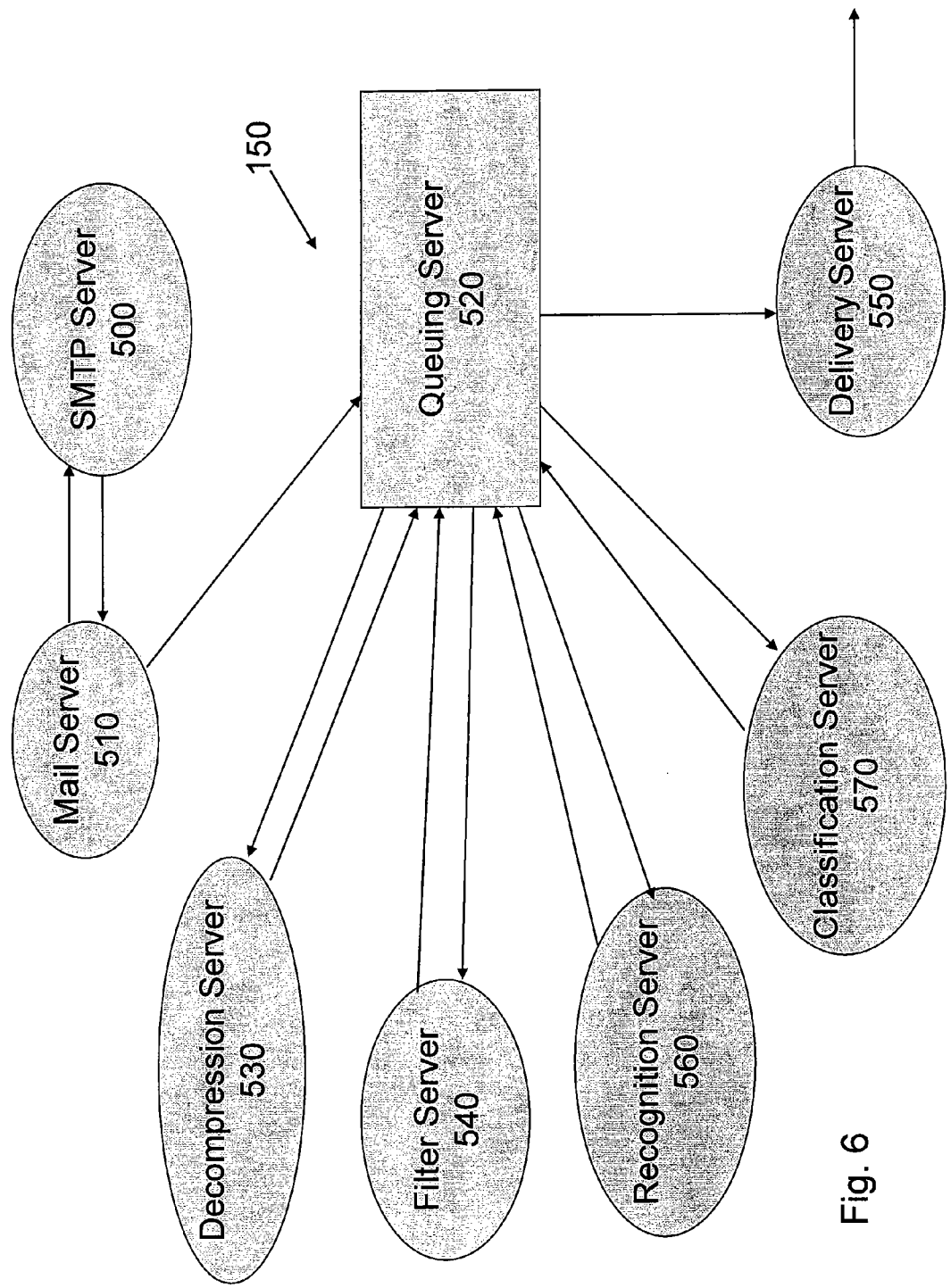
FIG. 6 is a schematic diagram illustrating components of a post-processing server of the system according to one exemplary embodiment.

The post-processing server portion 150 of the system 100 is schematically illustrated in FIG. 6. It can be implemented as one or several systems using conventional server technology that is known in the art. Software modules illustrated as circles in FIG. 6 can be implemented using known techniques depending on the operating system and the specific architecture that is chosen for the server. Each software module is referred to as a "Server" and is illustrated in FIG. 6 as such because it performs a distinct step in processing and can be segregated as a separate system. Each software module referred to as a Server may be a process or a collection of processes communicating using an inter-process communication mechanism of an operating system of a given computer. Depending on the chosen architecture, the post-processing server software may also reside in several physical computers communicating over a network. In short, the software-hardware architecture of the post-processing server 150 may be implemented in a variety of way as understood by a person skilled in the art.

As noted previously, the message from the cellular phone 110 is provided to the server system preferably over the cellular and Internet networks 130, 140. (Also, it may be delivered using a fax protocol or another known technique.). For example, the message can be sent to the e-mail address of the service provider. The message consists of a text message inserted by the user, an image of the document processed and compressed at the telephone as described above, and a CF flag identifying the type of the document and, preferably, capabilities of the telephone and the mode of delivery of the information to the user. The message also preferably includes information identifying the user (e.g. the Internet identification of the telephone of the user or another unique identification of the user), other information that may be useful for the disclosed service (e.g., identification of a communication service provider), as well as any other information customarily include in e-mail messages.

The transmitted message is received at SMTP server 500. The SMTP server 500 is typically a conventional e-mail server that receives, stores, retrieves and sends messages received via Internet 140. A software module 510 (Mail Server) polls the SMTP server 500 waiting for a new e-mail to arrive. Polling can be done at pre-determined intervals selected based on the system traffic and its processing capability as understood by a person skilled in the art. For example, polling may be every five minutes. It can also be adjusted based on the traffic statistics or it can be dynamically adjusted. The software module/software 510 identifies and downloads new e-mails (messages) received during the polling interval. The software 510 maintains a database conventionally constructed for storing such message with image attachments.

In addition, the mail server 510 validates the received e-mail and user information provided therein. Relevant information is extracted from the e-mail. This information includes the enclosed image, CF flag, and a user identifier (ID), e.g. e-mail address, phone number, or another conventional identifier. If any of the required information is missing, such e-mail is discarded and a message indicating an error is returned to the sender, if possible. In some embodiments, the e-mail is automatically resent by the telephone in response to an error message.

Next the received user identifier is validated. A user of the system 100 preferably maintains an account with the provider of system 100 and the post-processing server 150 stores account information conventionally associated with on-line services. Such account information may, for example, include user's contact and payment information as well user's preferences.

If user has been authenticated as a valid user of the system 100 and is in good standing, the processing continues as described herein. Otherwise, a message indicating an invalid user is returned, the received information is deleted, and processing in connection with such invalid user terminates.

For a valid user and a properly validated message, an entry is made in the shared database of the service associated with system 100. The entry is indexed by the current date and time and it includes text of the message, CF flag, the image, information about the user, and any other information useful for further processing that may have been supplied with the e-mail. Then a message is identified to software 520 with its shared database entry. Software 520 coordinates the processing of the received information and is referred to as queuing server 520. It includes a queuing database that identifies each submission under processing and scheduling software for invoking the proper software modules in the proper sequence. Software, such as the queuing server 520, is known in the art, see, e.g. "Object-Oriented Client/Server Internet Environments" by Amjad Umar, January 1997, Prentice Hall Press, which is hereby incorporated by reference in its entirety.

Other software modules of the system may poll the corresponding queue in the software 520 and retrieve messages ready for the corresponding step of processing. It performs ordered scheduling of processing and tracks the proper sequence of required operations as known in the art. If it receives an error indication resulting from one of the operations, it typically terminates the processing of a given message, returns the identification of the error to the user and to the system administrator and terminates the processing sequence of a given message, including a conventional clean up sequence for discarded information.

When the scheduling sequence reaches a given message, software 520 provides the information of the next message database entry to be processed to a software module which is next in the processing sequence or a given message. After a software module completes its operation, it stores the processed information in the database entry created for a given message and it signals to the queuing server 520 that a given step of processing has been successfully completed. (As noted, in the event of unsuccessful completion, the processing terminates). After a successfully-completed operation, the identifier of the message is queued awaiting the availability of the next operation. When next software module becomes available the queuing server 520 provides identification of the message to be processed including the identification of the location of the results of the previous stage of processing. Hereinafter, the processing sequence for one message is described, but it should be noted that multiple messages are scheduled as discussed above. Also, unless indicated to the contrary, for each processing step the informational output is stored centrally and then retrieved by the software module scheduled for the next step by the queuing server 520.

First queuing server 520 makes the message information available to a software module 530 referred to as Decompression Server 530. As noted, the image provided by the cellular phone 110 has been compressed so as to save the transmission bandwidth. An identification of such a conventional compression technique is done based on the CF value. The decompression software 530 performs a corresponding decompression operation, stores the results, and signals to the Queuing Server 520 that a given message has been successfully decompressed, or conversely that an error has occurred. In the embodiments that do not employ compression at the cellular phone 110, this operation is omitted.

This step is also omitted if the CF value indicates that the image was captured on a cellular phone 110 without a compression capability or if the image contains business information that does not require compression on the cellular phone 110.

Then, the message identification is provided from the queuing server 520 to a filter server software module 540. An exception is a generic image, which requires no further processing and therefore it is provided to a delivery server software module 550. It has been described in connection with the telephone operation (see FIG. 5 and accompanying discussion) that in some embodiments the image is processed before it is compressed and sent. In some embodiments, to simplify the telephone software architecture, the filter server 540 performs such a processing or a portion thereof. In addition, the image, even if already pre-processed at the telephone, is further enhanced using different techniques so that several differently filtered images (versions of the same original image) are obtained. The image enhancement processing steps in the filter server 540 depends on the value of the capture flag CF, which encodes the level of processing performed at the telephone and the preferred post-processing algorithm.

For example, business cards, receipt, generic documents and hand written notes captured on the cellular phone 110 without a pre-processing capability can be processed in the following steps:

1. Convert the captured image to an 8-bit grayscale image;
2. Apply a segmentation algorithm, such as the Otsu method, known in the art, to separate bright areas from the dark background of the image;
3. Apply multiple erosion-dilation filters to remove pepper noise and to smooth outside edges of the document;
4. Find black border areas and forming a board masking image; and
5. Masking the image so as to obtain an image comprising essentially only the relevant.

The business cards, receipts, generic documents and hand written notes captured on a cellular phone 110 with pre-processing capabilities can be processed in following steps:

1. Correct shadow and lightness gradients;
2. Perform background, foreground segmentation; and
3. Perform background noise removal.

For white board images the processing can employ the following steps regardless whether the phone has a pre-processing capability:

1. Correct shadow and lightness gradients;
2. Perform background, foreground segmentation;
3. Detect the contrast of the background;
4. Smooth the signal in the vicinity of the average background level; and
5. Suppress the saturation in the pixels that are in the vicinity of the white background.

Each individual step above is known in the art, see e.g. the William K Pratt reference cited above and incorporated by reference in its entirety.

The filtering is performed a number of times on each image so that when the operation is completed, the output is several filtered images, as well as the originally-received image. This information is stored centrally and control returns to the queuing server 520.

Next the images are processed at a software module 560 referred to as recognition server 560, except for generic images and white boards. Generic images and white boards require no further processing and therefore they are provide to the delivery server software module 550. Further if a user specified a fax delivery, for all the documents control is transferred to the delivery server software module 550, since no further processing is needed. Also only one resultant image for a document should be retained at this stage in the event of a fax delivery.

As with other software modular it polls the queuing server 520 periodically and monitors for the new data. For each new message, it performs an operation consistent with the CF flag. It copies the filtered data and performs either an OCR or an ICR operation for each of multiple images produced by the previous step of filtering. For printed text images, such as business cards, receipts, and text documents the operation is OCR, which is performed using known OCR techniques. For handwritten images, the operation is ICR, which is also known in the art. For the forms a combination of these techniques may be employed. Notably for hand-writing recognition, user-specific data preferably should be stored in the system in connection with the user account. For the users that maintain this information with the service, it is retrieved and provided to software (recognition server) 560.

For several types of documents the processing is terminated at the recognition server 560. In some embodiments, for generic text documents, user hand written documents, and forms no further processing is necessary. For such documents, the system 100 examines a metric indicating the quality of the OCR or ICR results and discards all the duplicate results except for the one of the highest quality, which is then stored in the shared database. For business cards and receipts, multiple OCR outputs are still retained for subsequent processing. Control then returns to the queuing server 520 for this message. The queuing server 520 checks the CF flag and determines whether a given document type requires additional processing. Based on this document classification, the control is passed to either the delivery server software module 550 or a classification server software 570.

For example, for business cards, forms and receipts, the classification server is the next step in the operation of the system for a received message. The classification server 570 analyzes the recognition server 560 results so as to interpret the printed information, for example, by isolating the person and company names, telephone number, and e-mail address for a business card, or the name of an establishment and amount paid for a receipt. The interpretation is performed for all the duplicate versions. The resultant interpreted information is organized in the fields corresponding to the meaning of the interpreted data as well as a metric indicating the quality of the interpretation process. Thereafter, only the record with the highest quality result is retained and stored in the shared database.

Figure 7:
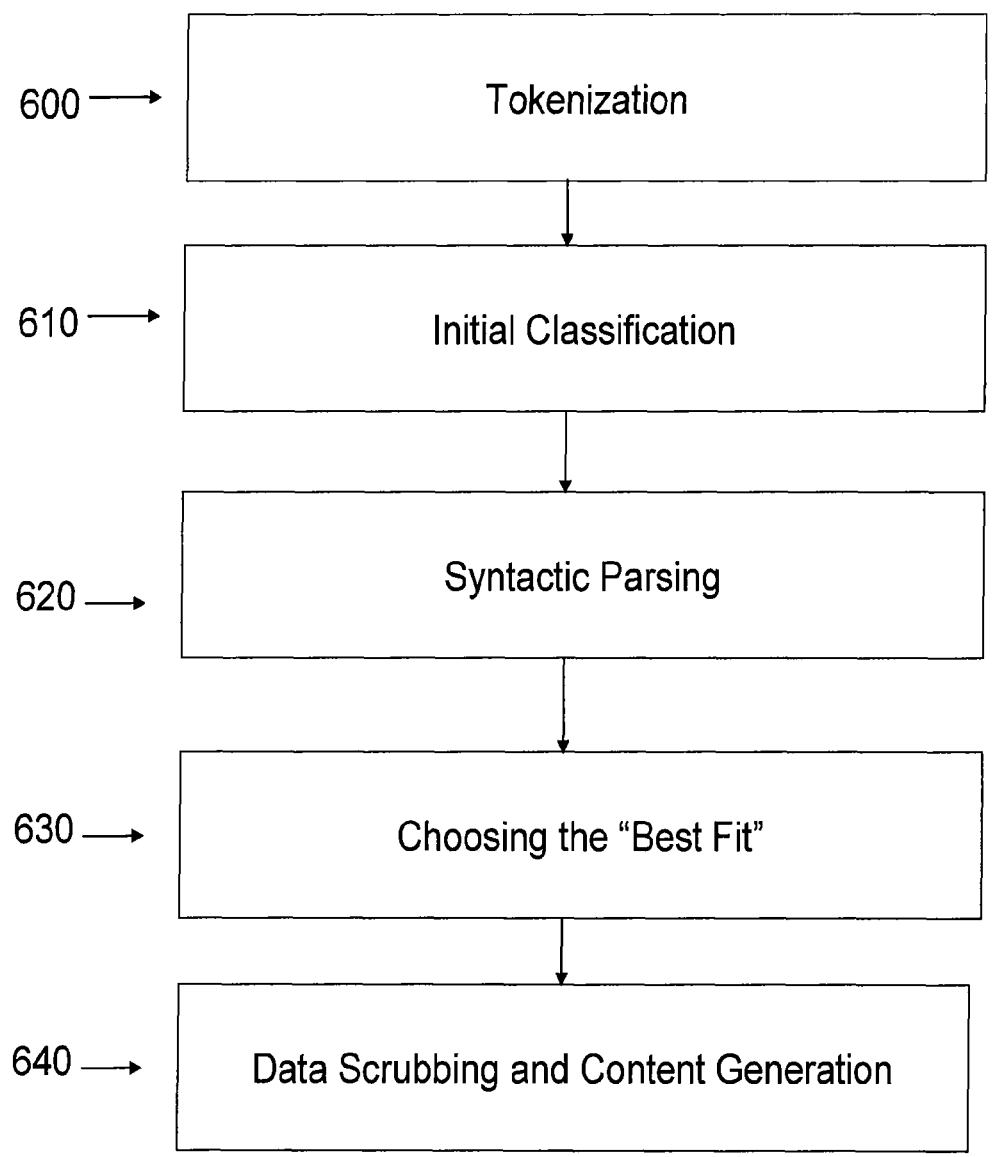
FIG. 7 is a flow chart illustrating a process flow of classification software which is part of the post-processing server of FIG. 6.

The processing flow in the classification server 570 is a pipeline shown in FIG. 7. This pipeline consists of a number of phases or steps, each of which has its own inputs and outputs. It should be noted that the processing flow as illustrated in FIG. 7 comprises steps that are known in the art of natural language recognition and grammar, see e.g., "Natural Language Understanding" by James Allen, 1995, Benjamin-Cummings Publishing Co., Inc. and "Compilers" by Alfred V. Aho, Ravi Sethi, Jeffrey D. Ullman, 1985, Addison-Wesley Longman, Inc, both of which are hereby incorporated by reference in their entireties.

More specifically, for business cards, the phases in the pipeline are as discussed below. Step 600 is a tokenization step. This phase or step 600 takes OCR characters as input and generates a set of tokenizations as output. A token is a set of characters that can be manipulated as a single entity. The tokenizations represent all the possible combinations of tokens using all reasonable character alternates that were determined by the OCR engine.

Step 610 is an initial classification step. At this phase or step 610, the classification pipeline takes a set of tokenizations as input and generates a tagged set of tokenizations as output. The tags are possible interpretations of tokens, such as name prefix, city, state, part of web address. Various heuristics can be applied to the tokens to determine what tokens can represent. Each token at this stage may have a number of tags. The tags may be assigned, for example, by dictionary look ups, identification postal zip codes and telephone numbers, look-up of position specific identifiers and other relevant filtering.

Step 620 is a syntactic parsing step. This phase or step 620 takes the tokenizations generated in the initial classification phase, where each token may potentially have a number of tags, and generates an output where each token only has a single tag. The tags are removed by applying syntactic grammar rules to the tokens and looking for streams that make sense.

Step 630 is a step of choosing the "best" fit. This phase takes each of the parsing outputs and picks out the "best" one. In this phase or step 630, the syntactically-parsed tokens provided by the previous phase are converted into the desired items (e.g., Name, Address, Company, Job Title, Work Phone, Mobile Phone).

Step 640 is data scrubbing and content generation. At this phase the output is further verified and some of the errors may be corrected using known data scrubbing techniques. For example, case of lettering can be adjusted, erroneous strings can be deleted, names and addresses can be standardized, and spelling errors can be corrected. After the scrubbing, a template is used based on user's preference to generate the output in the desired format.

The classification server 570 receives as input the OCR-recognized characters, one set of characters for each of the input images. Its operation is described herein in connection with business card processing. Similar techniques can be used for other syntactically structured documents, e.g. receipts. For business cards, the output of the classification server 570 is a contact record. Thus, the goal of the process is to recognize the data commonly present on a business card such as the names of a person and company, address, telephone, email and the like.

In general the classification server 570 employs techniques known in the fields of Artificial Intelligence and Grammar Processing to interpret as accurately as possible text produced by an OCR scan.

However, the business cards represent an example of a class of highly structured text documents for which the accuracy of interpretation could be significantly improved. There are two distinguishing properties of the members of this class: (1) There is a set of predefined linguistic structures that are generally present in every member of the class; and (2) Some of these structures are present in every member of this class only once (while others may occur more than once and yet others may or may not occur). The classification algorithm described below heavily exploits the above-mentioned properties.

The phases in the classification pipeline are described in more details below. First, however, the elements for defining the content of the document and the means used to analyze its structure are introduced.

The elementary part of the document that has a meaning is a token. A token is a set of characters that can be manipulated as a single entity. Tokens can have zero or more tags (i.e. identifiers) assigned to them. Tags can be added, removed, and queried. Tags identify the meaning of tokens recognized at a given stage of processing. Tokens may be alphabetic, alphanumeric, numeric and may include delimiters. Delimiters may have special meaning in determining the tag.

A grammar is used to evaluate groups of tokens (i.e., textual entities) that appear in the document (e.g. on the business card). A grammar is made up of several different entities: a name, a unique identifier (i.e., tag), a weight confidence (score) modifier, and syntax. The syntax is a textual representation of the rule used to evaluate sequences of tokens. The elements that make up the syntax include literals, tokens, and groups.

A literal is a fixed string represented by the text enclosed within single quotation marks. Examples of a literal element include:
  '@'; and
  'www'

The tokens are classified using the types of information that may be present on a business card. Example, for City, Company, Email, and Phone number are provided below.
  CITY
    A city name
  COMPANY
    A company name
  COMPANY_CLASS
    A company modifier such as "Inc", "Corp", or "LLC"
  EMAIL
    An email address part
  EMAIL_MARKER
    An email field identifier such as "email"
  PHONE_GROUP_11
    A 11 digit phone number
  PHONE_TYPE_ALT
    An alternate phone number identifier such as "alt"
  PHONE_TYPE_FAX
    A fax number identifier such as "fax"
  PHONE_TYPE_MAIN
    A main number identifier such as "phone" or "main" or "direct"
  PHONE_TYPE_MOBILE
    A mobile phone identifier such as "mobile" or "cell"
  PHONE_TYPE_PAGER
    A pager number identifier such as "pager"

In addition to these, there are two special case tokens. One of them is a delimiter that separates tokens. Another one is "NewLine" which identifies a token that represents a new line of text on the card.

A group is one or more elements that represent a sequence of elements. Each element in a group is evaluated in order and must sequentially match tokens in the evaluated data.

The grammar may be defined using a standard grammar notation, with rules represented using combinations of terminals and non-terminals. Such representation is standard within the art of grammar processing.

For example, a type may be declared at the start of the definition, followed by a colon and then by the constituent parts of the group grammar. The type is a single word followed by a colon (':') that represents the name of the group, which the group is assigned. The following are three examples of definitions of groups declared with a type using a standard notation:
  (CITY: CITY)
  (COMPANY: COMPANY COMPANY_CLASS)
  (PHONE_MAIN: PHONE_TYPE_MAIN PHONE_GROUP_11)

Syntax elements can have a modifier that describes the number of times that the element can be repeated. Only one modifier is allowed per element. Modifiers appear directly after the element that it affects. Modifiers include the following:
  {x,y} means minimum and maximum number of times the element may appear, where x is a numeric value that represents the minimum number of times the element may appear and y is a numeric value that represents the maximum number of times the element may appear;
  {x} means specific number of times an element may appear (this is functionally equivalent to {x,x}), where x is a numeric value that represents the number of times the element may appear;
  {x,} means the minimum number of times an element may appear (this is functionally equivalent to {x,∞}), where x is a numeric value that represents the minimum number of times an element may appear;

{,x} means the maximum number of times an element may appear (this is functionally equivalent to {0,x}), where x is a numeric value that represents the maximum number of times an element may appear;

*—The element may appear zero or more times (this is functionally equivalent to both {0,∞} and {0,});

+—The element may appear one or more times (this is functionally equivalent to both {1,∞} and {1,}); and ?—The element may appear zero or one time (this is functionally equivalent to {0,1}.

Returning to the discussion of the specific phases illustrated in FIG. 6, phase 1 of the classification pipeline takes a number of OCR character sets as input and generates a set of tokenizations as output, one set for each input character set. A tokenization represents a set of unique tokens, representing all the possible combinations of characters using all reasonable OCR character alternates that were determined by the OCR engine.

As known in commercially available OCR's, the output of the OCR includes confidence values and alternates for each "position" (character) of the recognition stream. Each character processed in this stage is assigned the following properties: (a) Value—the character; (b) CharacterConfidence—degree of confidence that this is a correct character; (c) WordConfidence—degree of confidence that the character is in a given word; (d) OcrCharacter—OCR output for this character; (d) CharacterType—the type of character; (d) Alternates—The character alternates for this character.

It is assumed in this embodiment that each recognized character might have, for example, up to 3 alternate "guesses." Spaces and new lines are encoded as properties of the leading or following character, not as individual characters themselves. The "best" guess is always presented first in the sequences of alternatives.

Thus, the process of building tokenizations is performed by considering each character and creating tokens by combining characters between consecutive delimiters. The delimiters are the characters that are not alphanumeric characters with the only exceptions being "!" and "#" (these often have OCR alternates which are alphanumeric). Where alternative characters exist they result in alternative tokens, which are included in a different tokenization. This way a number of tokenizations comprising ordered collections of tokens are created, wherein each such tokenization is unique.

A person skilled in the art shall appreciate that a processing of a document, represented as tokenizations comprised of tokens, as described herein, may be employed in other embodiments, which use a general approach of subdividing a document into blocks of characters or symbols and identifying the meaning of such blocks and sets thereof.

Phase 2 of the classification pipeline takes a group of tokenizations as input and generates a "tagged" set of tokenizations as output. The tags predict the possible meaning of each token without regard for grammar matching. Each token is assigned all the tags for which a tag dictionary match exists (COMPANY, COMPANY_CLASS, CITY, etc.) identifying token's meaning that could possibly apply to it semantically. One of the many possible semantic representations will later be chosen. The tags are assigned via a process, each of which takes a tokenization as input and outputs a data structure with assigned relevant tags.

The classification subsystem uses dictionaries to perform lookups on words. Such dictionaries are employed in the process that assigns tags based on the results of dictionary look-ups. Dictionary types are a subset of all the data types to be extracted from the input document. The following are examples of dictionary types:

| Dictionary | Description |
| --- | --- |
| COMPANY | Common words in company names |
| COMPANY_CLASS | Company classes: Ltd., LLC, LLP, Inc., Corp., Corporation, etc. |
| PHONE_TYPE_MOBILE | Indicators of mobile phones: Cell, Mobile, etc. |
| PHONE_TYPE_FAX | Indicates a fax number: Fax, Facsimile, etc. |
| PHONE_TYPE_MAIN | Indicates a main phone number: Main, Voice, etc. |
| PHONE_TYPE_ALT | Indicates an alternate phone number: Alt, Alternate, etc. |
| PHONE_TYPE_PAGER | Indicates a pager number: Pager, etc. |
| CITY | Common cities: NY, New York, Denver, San Francisco, SF, Atlanta, Seattle, Palo Alto, Menlo Park, etc. |
| EMAIL_MARKER | Indicators of an email address: Email, E-Mail, etc. |

Figure 8:
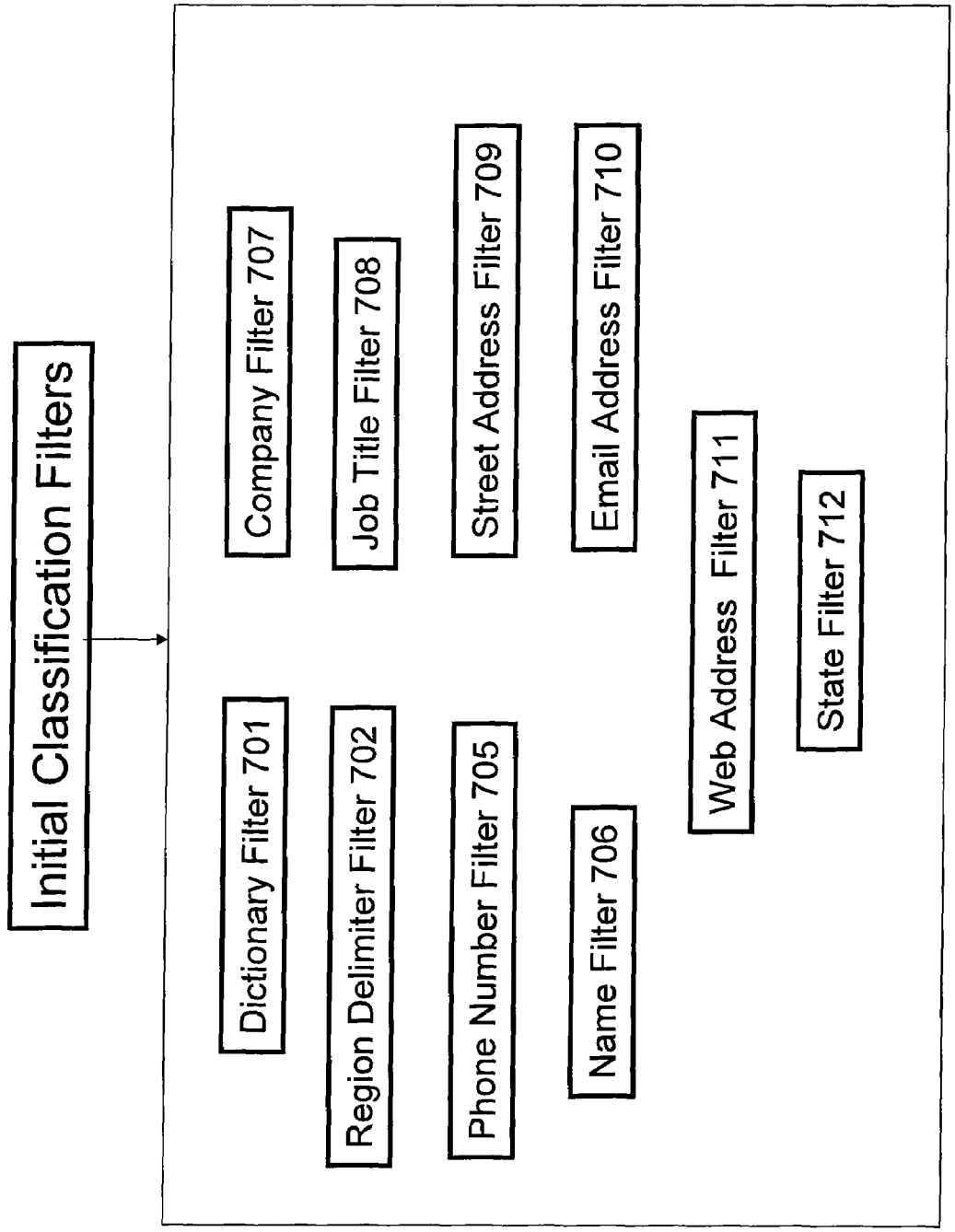
FIG. 8 is schematic diagram illustrating initial classification filters used in the present system.

The filtering is described more specifically in connection with FIG. 8. A dictionary filter 701 provides look up of a token in various known dictionaries, such as dictionaries for individual and company names. If a match is found a corresponding tag is added to the token. Further the dictionary entries contain scores related to the associated probabilities, which is also added to the token. This probability may be reduced if a dictionary match was partial, for example if one character of the token was different from the dictionary entry.

Region delimiter filter 702 identifies tokens representing either a line feed or a large group of spaces.

Phone number filter 705 tags 10 and 11 digit-long sequences with spaces and delimiters. It also tags alphanumeric tokens that may be extensions.

Name filter 706 assigns tags to tokens on the same line of a token that was identified as a name in the dictionary. The probability decreases for the tokens located further away on the same line. This filter also locates potential name prefixes, suffixes, and other attributes commonly found next to a name and assigns tags to neighboring tokens.

Company filter 707 assigns tags to tokens on the same line of a token that was identified as a company name in the dictionary. This filter also locates potential company designators commonly found next to a company name (e.g., LLC, Inc., LLP.) and assigns company name tag to neighboring tokens.

A job title filter 708 determines if a token is a job title through a dictionary match for common words used a title. Then it may assign neighboring tokens on the same line the job title tags. A street address filter 709 tags numeric and alphanumeric tokens as street numbers, uses found street suffixes to strengthen preceding address related tags on the same line, tags alphabetic and neighboring numeric and delimiter tokens as potential street names and uses "address part" (e.g., suite, building) dictionary matches to tag neighbors.

An email address filter 710 starts from the end of the document and looks for an email address suffix. The filter also employs weights to modify confidence (score) using value and type of each successive token.

A web address filter 711 starts from the document and looks for a web address suffix. The filter also employs weights to modify confidence using value and type of each successive token.

A state filter 712 removes any "partial phrase" dictionary matches and modifies confidence level of state abbreviation based on the letters casing.

As a result of the above tagging operations, most tokens have been assigned one or more tags indicating meaning. Phase 3's responsibility is to reduce the multiplicity of tokenizations by ranking the tag choices in compliance with grammatical rules such that those with the highest score are also those that make syntactic sense. Thus, syntactic parsing engine of Phase 3 receives as input the tokenizations of Phase 2, where each token may potentially have a number of tags, and generates a large number of outputs where each token only has a single tag and each output has an aggregate score.

Tags are winnowed by applying syntactic grammar rules as explained earlier in this document to the tokens looking for streams that make sense syntactically. It should be noted that each individual tokenization might result in multiple syntactically valid outputs each with a different aggregate score.

As noted, parsing of syntactic structures is known in the art. In one embodiment, this phase employs a parser that uses a depth-first search of parse trees to find syntactically valid sequences of tokens. Each tag is checked recursively until all grammar matches are found. A grammar match is a segment of a tokenization that matches a predetermined rule, for example, a rule for a structure of an address. When evaluating a grammar, the traditional approach has been to have a pre-described path that mandates the exact sequence of a set of tokens and such tokens must be found in such order to have a successful match. Due to the unknown ordering of tokens, it is preferable to create from the grammar a set of parse trees that describe the successful sequence of tokens assuming any token may in fact be at the start of a set of tokens. That is, a grammar is parsed beforehand so as to build a set of trees based on the potential routes that a particular set of tokens can take.

Using this approach the parsing may begin anywhere in the document and may include searching both forward and backward to satisfy conditions of grammar rules. It should be noted, however, that other parsing techniques, known in the art, may be employed for parsing the document.

Often multiple grammars evaluate the same token in different ways. In order to resolve overlaps in a grammar, each grammar has a default confidence and each token from the parse results also has a confidence. Combined together, the matching results have an overall confidence measure indicating a probability of a correct result.

Classification Phase 4 receives as input multiple grammar matches for the tokenizations from phase 3 and determines the tokenization, with the most likely properly labeled with correct tags.

Figure 9:
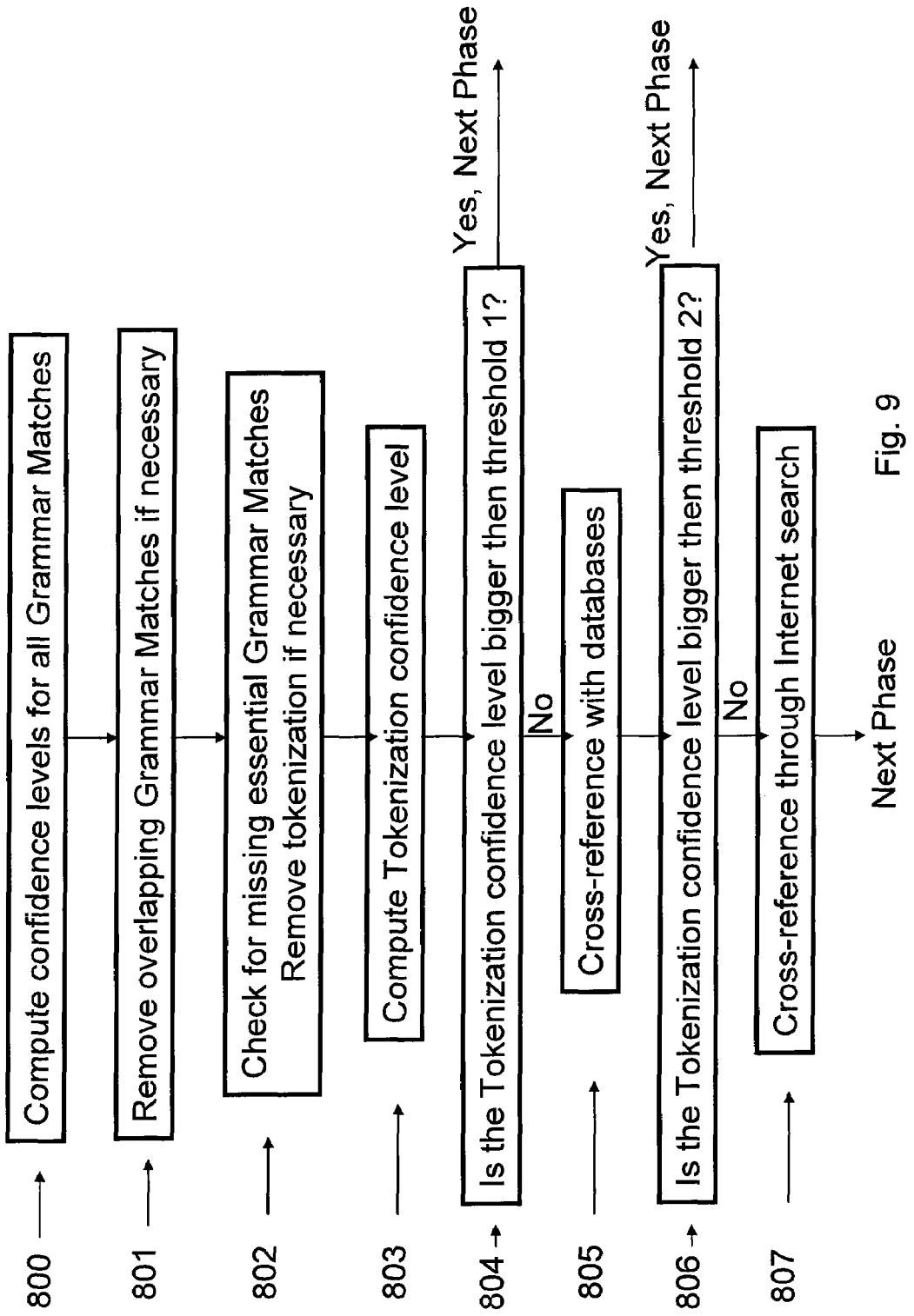
FIG. 9 is a flow chart illustrating an exemplary process for one tokenization in accordance with the present system.
Figure 10:
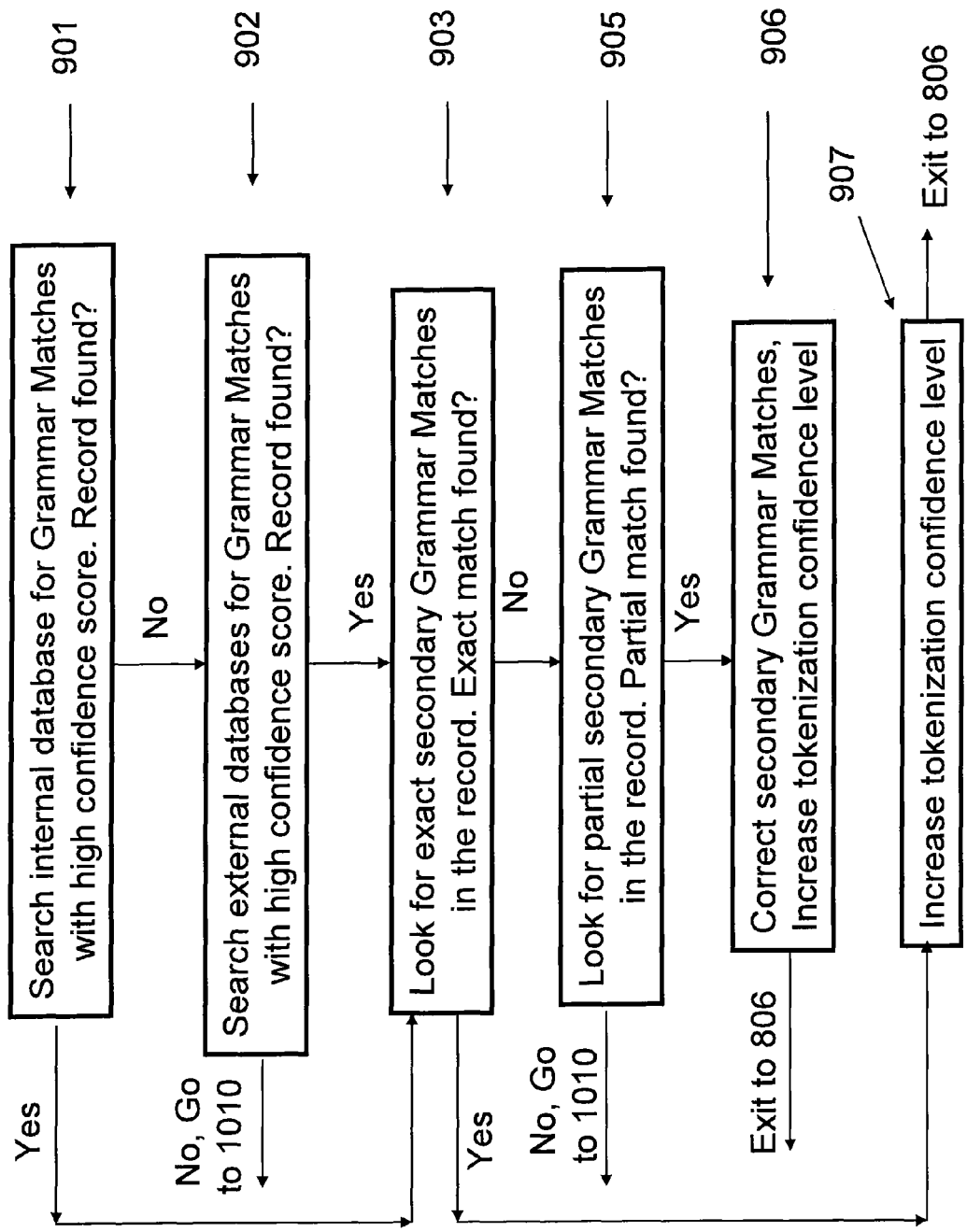
FIG. 10 is a flow chart illustrating an exemplary database processing process in accordance with the present invention.
Figure 11:
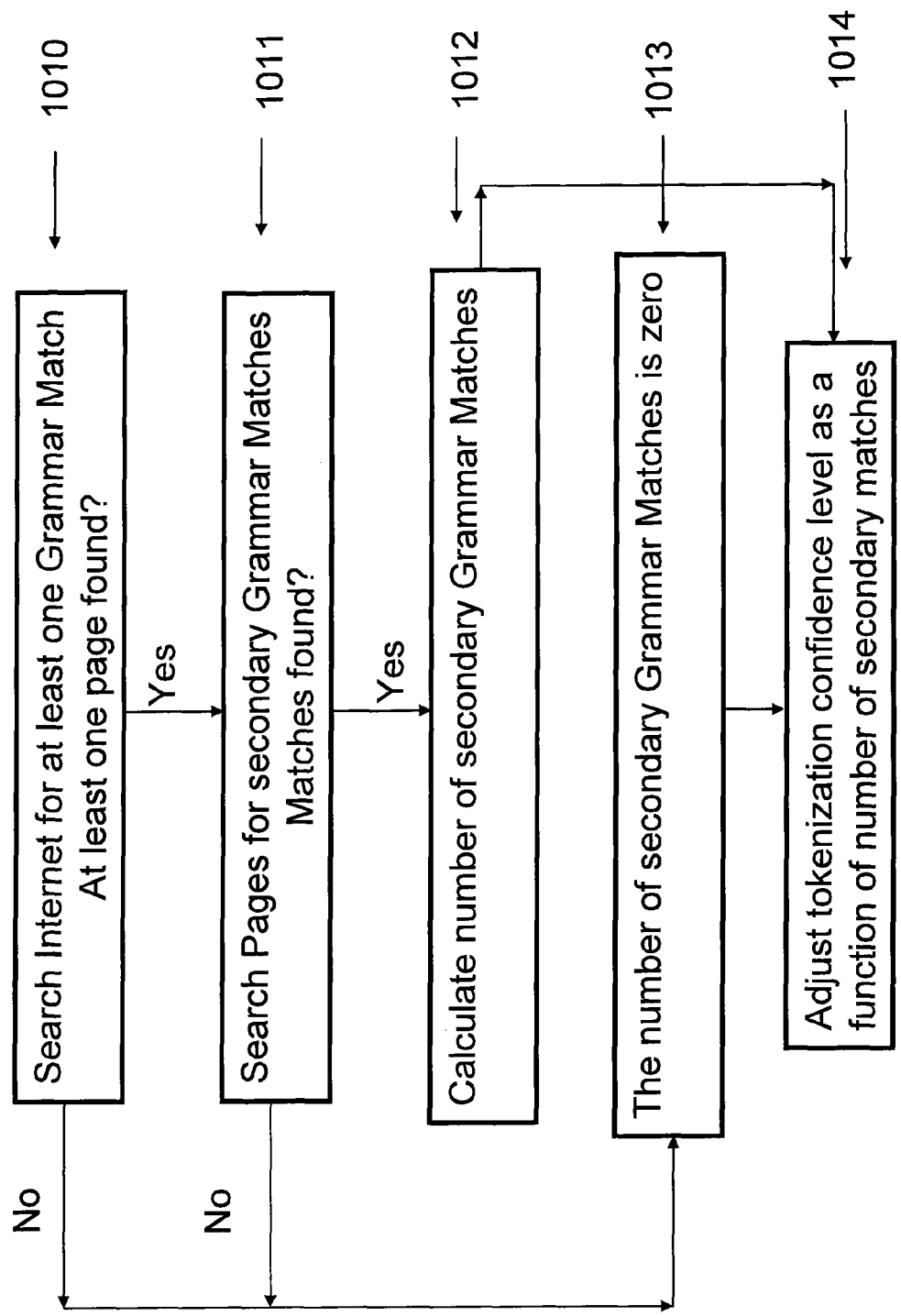
FIG. 11 is a flow chart illustrating a process of searching the Internet for one grammar match in accordance with the present invention.

FIGS. 9-11 illustrate the process implemented at this phase. FIG. 9 illustrates the process for one tokenization. It should be noted that this process is repeated for all the tokenizations of a card that is being processed. First, at step 800 the system computes a confidence score for each grammar match of the tokenization based on the confidence level of each token and optionally some additional information that may be obtained during parsing at phase 3. Then, at step 801, the grammar match is compared to the other grammar matches for this tokenization so as to remove the overlapping matches. During this process duplicate grammar matches with lower confidence score are discarded. Next, (step 803) the selected grammar matches are tested to indicate that all the essential information has a corresponding grammar match. For example, in a business card a grammar match for a phone number must be present. A tokenization with missing essential grammar matches is discarded from the set of possible results and process terminates for such a tokenization.

Otherwise, control proceeds to step 803, where the system computes the overall confidence level for the tokenization based on the confidence levels associated with the remaining grammar matches. Then, at 804, the tokenization confidence is compared to a predetermined threshold. If it is sufficiently high, the process terminates for this tokenization.

After completion of confidence scoring, control proceeds to the database processing of FIG. 10 that performs database look ups to further modify the confidence score. For example, the name of the company may be compared to the domain name appearing in an email address. A match between the company name and its associated domain name will increase the score. If the score was not sufficiently improved after the database look up (see step 806), the tokenization is processed with an aid of Internet searching. Thereafter, this process terminates for a given tokenization.

Referring to FIG. 10, the system checks certain grammar matches in internal databases stored in the system in step 900. If a match is found, a record for such match is retrieved and control proceeds to step 903. Otherwise control proceeds to step 902 where such grammar matches are checked against known external databases managed by entities unrelated to the present system and accessible over the Internet. If a match is found in such external database, the record is retrieved and control proceeds to step 903.

At 903, the system checks whether the retrieved record contains one or more additional grammar matches from the same tokenization, thereby indicating that the interpretation is likely correct. For example, if in a record retrieved based on a company name, the address grammar match also matches to the one stored in the record, it can be concluded that the interpretation is accurate. In this case control proceeds to step 907, where the overall confidence of the tokenization is increased based on successful matches and the process terminates. If there are no successful matches, the process proceeds to 905, where a partial match with secondary grammar matches is attempted. Based on such partial match, secondary grammar matches may be corrected based on the database record and the overall tokenization level increased in step 906.

Referring to FIG. 11, a system searches the Internet at 1010 for one of the grammar matches, e.g. for a name, and if the at least one page is found control proceeds to step 1011. At this step, the located pages are searched for matches with other grammar matches from the same tokenization. At 1012, the system computes the number of such matches with other (secondary) grammar matches and if such number is greater than zero (step 1013) control proceeds to step 1014. At this step, based on the number of matches determined in step 1012, the confidence level of the tokenization is increased, since large number of matches indicates the likelihood that the information was interpreted accurately.

Figure 12:
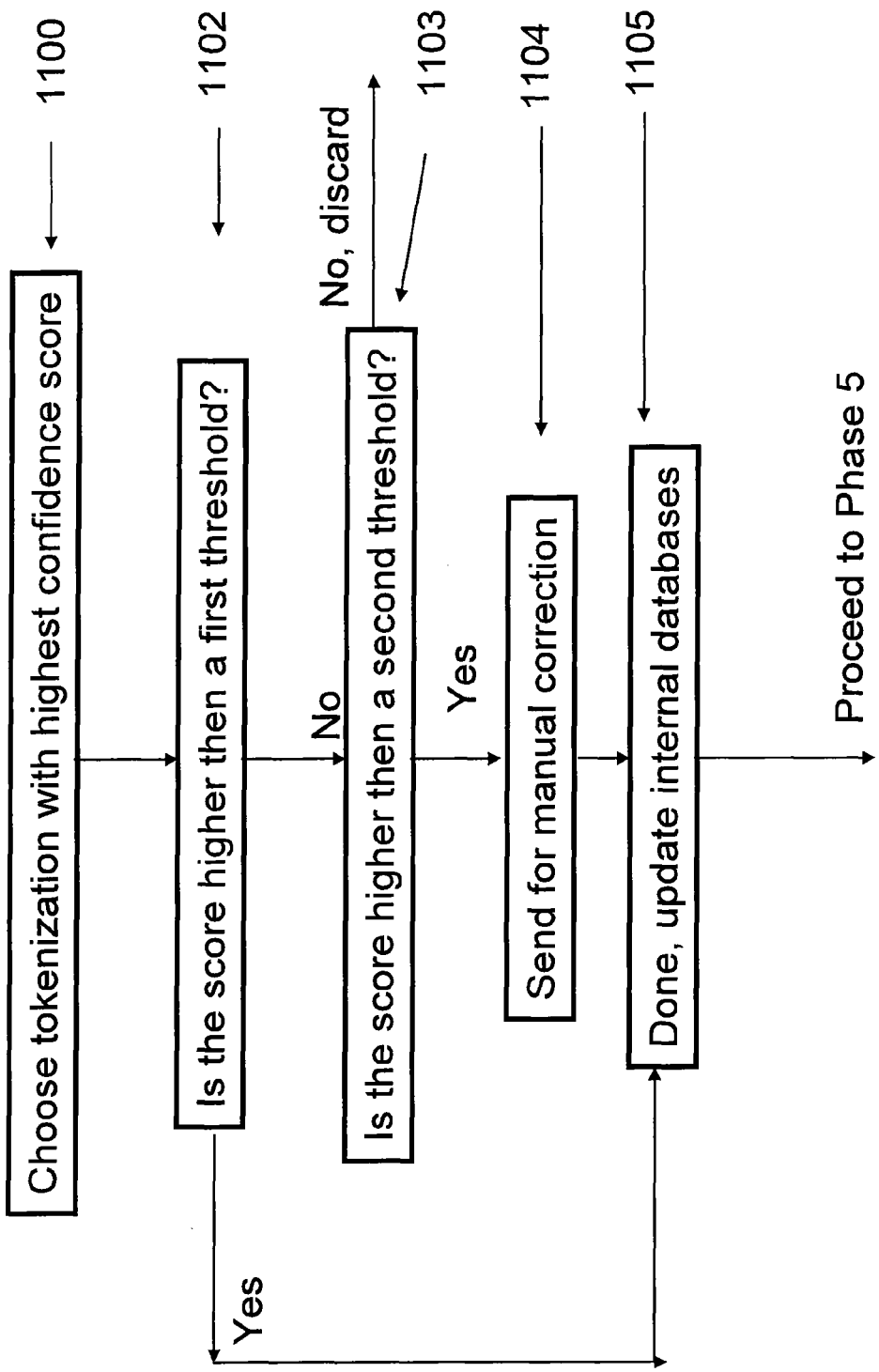
FIG. 12 is a flow chart illustrating a process of assigning a certain level of confidence to all of the tokenizations that have been processed in accordance with the present invention.

Referring to FIG. 12, at this point all the tokenization have been processed and assigned a certain level of confidence. At step 1101, the system identifies the tokenization with the highest confidence level. If this confidence level is higher that a predetermined threshold (see step 1102) the processing terminates at this phase and the system proceeds to phase 5 where the information is extracted for the user. Otherwise, the control is transferred to step 1102, where the final confidence level is compared to a second threshold. If the confidence level is higher that the second threshold (step 1103) the document is forwarded for manual processing (see step 1104). More specifically, the image of the document and its OCR representations are provided to a human operator. The operator visually interprets the information and then returns the interpreted document to the system.

Classification Phase 5—Extraction and Cleanup

In the Phase 5 the system uses the previously obtained information to extract the business card data from the tokenization with the "best" Grammar Match results.

The following process takes place:

Extract card field data from Grammar Match results;

Perform some scrubbing of the data, like ensuring the phone numbers are numeric; names have only characters, etc. NOTE: These could be different because of OCR "fuzziness" from earlier, so it's at this state that we finally say that the "I" must be a "1" in the phone number;

Generate the contact record in a format suitable for storage and distribution such as a vCard; and Update internal databases with the information extracted from a successfully generated vCard.

During the processing at the classification server 570, grammar, dictionaries and other relevant rules are chosen based on the value of the CF flag (for example to distinguish business cards from receipts). For receipts the grammar and dictionaries are different but the sequence of steps is the same as discussed above and not repeated here.

The final step of the processing on the server is provided by software 550 referred to as the delivery server 550. It is responsible for packaging the resultant information and sending it to the e-mail account of the user, which is stored in the user database in connection with the user account of the service. The message to the user includes the processed document as discussed above as well the original text message (inserted by the user). If a user selects to store this information on the post-processing server 150, then it is stored in connection with the user account. A user has a capability to log on to the server and retrieve this stored information. Also, as previously noted, a user may receive a fax output from the disclosed service. The fax number may be stored in connection with the user account or a different number may be provided from the telephone as a part of the set up process. As noted in FIG. 4, the fax number can be entered at the user interface. If entered, this number becomes part of the CF flag, and it overrides that default number stored for the user. If a fax option is selected, the delivery server 550 sends the result of the processing by fax as known in the art.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. Doubtless numerous other embodiments can be conceived that would not depart from the teaching of the present invention whose scope is defined by the following claims.

What is claimed as new and desired to be protected by Letters Patent of the United States is:

1. A system for use in interpreting information in a document, comprising:
   a mobile device having a camera, the mobile device performs actions, including:
      receiving a user input identifying a type of information to be captured using the camera;
      automatically adjusting capturing information of the mobile device and camera based on the user input of identified type of information;
      capturing an image identified by the user and corresponding to the identified type of information to be captured;
      providing the captured image over a network; and
   a server device that performs actions, including:
      receiving the captured image;
      performing an image enhancement activity on the received image based on a value of a capture flag (CF);
      based further on the value of the CF, optionally performing an optical character recognition (OCR) or handwriting recognition (ICR) operation on the received image to generate a result with textual information; and
      if the result is determined to include textual information, performing a classification of the result with textual information to interpret the included textual information.

2. The system of claim 1, wherein the mobile device performs actions, further including:
   based on the selected type of information, generating the corresponding CF;
   after capturing the image, pre-processing the captured image in accordance with the CF, wherein at least a portion of the pre-processing comprises tagging the image; and
   wherein the pre-processing further comprises at least one of removing a surrounding field of the captured image, selecting at least a portion of the image based on a motion blurring technique, performing a deskewing operation on the image, or removing barrel distortion from the captured image.

3. The system of claim 2, wherein the CF includes additional information that identifies a type of hardware or software associated with the mobile device or camera.

4. The system of claim 1, wherein performing an image enhancement activity further comprises:
   based on the CF, if the received image is determined at least one of a business card, a receipt, a generic document, or handwritten notes that have not been pre-processed at the mobile device, then, performing the following actions at the server device:
      converting the image into a grayscale image;
      applying a segmentation algorithm to the grayscale image to separate bright areas from dark background areas;
      applying a multiple erosion-dilution filter to the resulting segmented image to remove pepper noise or to smooth outside edges;
      forming a board masking image; and
      masking the image.

5. The system of claim 1, wherein performing an image enhancement activity further comprises:
   based on the CF, if the received image is determined at least one of a business card, a receipt, a generic document, or handwritten notes that has been pre-processed at the mobile device, then, performing the following actions at the server device:
      performing a shadow and lightning gradient correction to the image;
      performing a background and foreground segmentation on the corrected image; and
      removing background noise from the segmented image.

6. The system of claim 1, wherein performing an image enhancement activity further comprises:

based on the CF, if the received image is determined a white board image, then, performing the following actions at the server device:
performing a shadow and lightness gradient correction to the captured image;
performing a background and foreground segmentation on the image;
performing contrast detection and correction on the segmented image;
smoothing at least a portion of the image signal in a vicinity of an average background level; and
suppressing a saturation of pixels in a vicinity of a white background on the image.

7. The system of claim 1, wherein the classification of the textual information further comprises:
interpreting the textual information to isolate at least one of a name of a business, a name of a person, a telephone number, or an email address;
performing the interpretation on a plurality of duplicate versions of the textual information, where each resulting interpretation includes a metric indicating a quality of the interpretation; and
selecting the resulting interpretation having a highest metric.

8. A non-transitory computer-readable storage medium that includes data and instructions, wherein the execution of the instructions on a server device provides for interpreting information in a document by enabling actions, comprising:
receiving, from a remote device, a captured image and a value of a capture flag (CF) that includes at least an indication of a type of professional information within the captured image, and information about a capturing device from which the image was captured;
performing an image enhancement activity on the received image based on a value of a capture flag (CF);
based further on the value of the CF, optionally performing an optical character recognition (OCR) or handwriting recognition (ICR) operation on the received image to generate a result with textual information; and
if the result is determined to include textual information, performing a classification of the result with textual information to interpret the included textual information.

9. The computer-readable storage medium of claim 8, wherein the type of professional information includes one of a business card, a receipt, a form, a printed document, a handwritten note, a whiteboard image, or a graphic indicia.

10. The computer-readable storage medium of claim 8, wherein performing an image enhancement activity further comprises:
examining the CF; and
based on examination of the CF, if the received image is determined at least one of a business card, a receipt, a generic document, or handwritten notes that have not been pre-processed at the mobile device, then, performing the following actions at the server device:
converting the image into a grayscale image;
applying a segmentation algorithm to the grayscale image to separate bright areas from dark background areas;
applying a multiple erosion-dilution filter to the resulting segmented image to remove pepper noise or to smooth outside edges;
forming a board masking image; and
masking the image.

11. The computer-readable storage medium of claim 8, wherein performing an image enhancement activity further comprises:
examining the CF; and
based on examination of the CF, if the received image is determined at least one of a business card, a receipt, a generic document, or handwritten notes that has been pre-processed at the mobile device, then, performing the following actions at the server device:
performing a shadow and lightning gradient correction to the image;
performing a background and foreground segmentation on the corrected image; and
removing background noise from the segmented image.

12. The computer-readable storage medium of claim 8, wherein performing an image enhancement activity further comprises:
examining the CF; and
based on examination of the CF, if the received image is determined a white board image, then, performing the following actions at the server device:
performing a shadow and lightness gradient correction to the image;
performing a background and foreground segmentation on the corrected image;
performing contrast detection and correction on the segmented image;
smoothing at least a portion of the image signal in a vicinity of an average background level; and
suppressing a saturation of pixels in a vicinity of a white background on the image.

13. The computer-readable storage medium of claim 8, wherein performing a classification further comprises:
receiving the textual information from the OCR or ICR operation;
generating a set of tokenizations, wherein a token is a set of characters that can be manipulated as a single entity, and wherein the set of tokenizations represent possible combinations of tokens using character alternatives from the OCR or ICR operations;
generating from the set of tokenizations, a tagged set of tokenizations, the tags representing possible interpretations of the tokens;
performing a syntactic parsing on each tokenization in the set of tokenizations based on a determined grammar to obtain multiple tokenizations with a single tag assigned to each token; and
selecting as a final tokenization one tokenization with tags based on an aggregate score from the multiple tokenizations as interpreted textual content.

14. The computer-readable storage medium of claim 8, wherein a grammar dictionary is employed to interpret the text information.

15. A system that is configured to interpret information in a document, comprising:
a memory for receiving and storing a captured image, and for storing computer-executable instructions; and
a processor that executes a plurality of computer-executable instructions on the captured image to perform actions, including:
receiving, from a remote device, the captured image and a value of a capture flag (CF) that includes at least an indication of a type of professional information within the captured image, and information about a capturing device from which the image was captured;

performing an image enhancement activity on the received image based on a value of a capture flag (CF);

based further on the value of the CF, optionally performing an optical character recognition (OCR) or handwriting recognition (ICR) operation on the received image to generate a result with textual information; and if the result is determined to include textual information, performing a classification of the result with textual information to interpret the included textual information.

16. The system of claim 15, wherein the remote device is a mobile handheld device having a camera that is configured to perform actions, including:

receiving an input selection from a user that identifies the type of professional information;

adjusting the camera or the mobile handheld device based on the selection of type of professional information;

capturing the image based on the adjustments; and pre-processing the captured image, wherein the pre-processing is further adjusted for the selected type of professional information.

17. The system of claim 16, wherein the pre-processing of the captured image further comprises at least one of removing a surrounding field of the image, selecting at least a portion of the image based on a motion blurring technique, performing a deskewing operation on the image, or removing barrel distortion from the captured image.

18. The system of claim 15, wherein performing an image enhancement activity further comprises:

based on the CF, if the received image is determined at least one of a business card, a receipt, a generic document, or handwritten notes that have not been pre-processed at the mobile device, then, performing the following actions at the server device:

converting the image into a grayscale image;

applying a segmentation algorithm to the grayscale image to separate bright areas from dark background areas;

applying a multiple erosion-dilution filter to the resulting segmented image to remove pepper noise or to smooth outside edges;

forming a board masking image; and masking the image.

19. The system of claim 15, wherein performing an image enhancement activity further comprises:

based on the CF, if the received image is determined at least one of a business card, a receipt, a generic document, or handwritten notes that has been pre-processed at the mobile device, then, performing the following actions at the server device:

performing a shadow and lightning gradient correction to the image;

performing a background and foreground segmentation on the corrected image; and removing background noise from the segmented image.

20. The system of claim 15, wherein the classification of the textual information further comprises:

interpreting the textual information to isolate at least one of a name of a business, a name of a person, a telephone number, or an email address;

performing the interpretation on a plurality of duplicate versions of the textual information, where each resulting interpretation includes a metric indicating a quality of the interpretation; and selecting a resulting interpretation having a highest metric.

* * * * *